US010914201B2

(12) United States Patent
Patel et al.

(10) Patent No.: US 10,914,201 B2
(45) Date of Patent: Feb. 9, 2021

(54) INTEGRATED COOLING SYSTEM FOR ENGINE AND WASTE HEAT RECOVERY (71) Applicant: CUMMINS INC., Columbus, IN (US)

(72) Inventors: Prashant P. Patel, Greenwood, IN (US); Christopher R. Nelson, Columbus, IN (US); Prashaanth Ravindran, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 144 days.

(21) Appl. No.: 16/060,475

(22) PCT Filed: Dec. 18, 2015

(86) PCT No.: PCT/US2015/066616
§ 371 (c)(1),
(2) Date: Jun. 8, 2018

(87) PCT Pub. No.: WO2017/105480
PCT Pub. Date: Jun. 22, 2017

(65) Prior Publication Data
US 2018/0355765 A1 Dec. 13, 2018

(51) Int. Cl.
*F01K 23/06* (2006.01)
*F01K 23/10* (2006.01)
(Continued)

(52) U.S. Cl.
CPC ............ *F01K 23/065* (2013.01); *F01K 23/10* (2013.01); *F01K 23/101* (2013.01); *F01P 7/16* (2013.01);
(Continued)

(58) Field of Classification Search
CPC ...... F01K 23/065; F01K 23/10; F01K 23/101; F01P 2003/001; F01P 2007/146; F01P 2025/30; F01P 7/16; F02B 29/04
See application file for complete search history.

(56) References Cited

U.S. PATENT DOCUMENTS 6,450,283 B1 9/2002 Taggett
8,341,951 B2 1/2013 Prior et al.
(Continued)

OTHER PUBLICATIONS

International Search Report from corresponding published PCT Application No. WO 2017/105480 dated Feb. 23, 2016, pp. 1-2.
(Continued)

*Primary Examiner* — Anthony Ayala Delgado
(74) *Attorney, Agent, or Firm* — Foley & Lardner LLP (57) ABSTRACT

An example system includes an engine and an exhaust passage fluidly coupled to the engine. A waste heat recovery system includes a boiler operatively coupled to the exhaust passage, and a condenser fluidly coupled to the boiler. An integrated cooling system includes an engine cooling circuit, a waste heat recovery cooling circuit, a waste heat recovery bypass valve, and a controller. The waste heat recovery bypass valve is operatively coupled to the exhaust passage upstream of the boiler, and is selectively controllable so as to direct at least a portion of the exhaust gas through an exhaust bypass passage so as to bypass the boiler. The controller is in operative communication with the waste heat recovery bypass valve. The controller is structured to determine a cooling demand of the engine, and to control a valve position of the waste heat recovery bypass valve based on the cooling demand.

10 Claims, 3 Drawing Sheets (51) Int. Cl.
*F01P 7/16* (2006.01)
*F02B 29/04* (2006.01)
*F01P 3/00* (2006.01)
*F01P 7/14* (2006.01)

(52) U.S. Cl.
CPC ........ *F02B 29/04* (2013.01); *F01P 2003/001* (2013.01); *F01P 2007/146* (2013.01); *F01P 2025/30* (2013.01)

(56) References Cited

U.S. PATENT DOCUMENTS

| | | |
|---|---|---|
| 8,776,517 B2 | 7/2014 | Ernst et al. |
| 2011/0005477 A1 | 1/2011 | Terashima et al. |
| 2013/0019847 A1 | 1/2013 | Nelson et al. |
| 2013/0199178 A1 | 8/2013 | Kanou et al. |
| 2014/0182266 A1* | 7/2014 | Hendrickson ........... F01K 23/10 60/273 |
| 2014/0202149 A1 | 7/2014 | Park |
| 2017/0241324 A1* | 8/2017 | Liu ........................... F01P 5/10 |

OTHER PUBLICATIONS

Written Opinion from corresponding published PCT Application No. WO 2017/105480 dated Feb. 23, 2016, pp. 1-5.

\* cited by examiner

INTEGRATED COOLING SYSTEM FOR ENGINE AND WASTE HEAT RECOVERY

CROSS-REFERENCE TO RELATED APPLICATIONS

This application is the U.S. National Stage of PCT Application No. PCT/US2015/066616, filed Dec. 18, 2015, the contents of which are incorporated herein by reference in their entirety.

TECHNICAL FIELD

The present disclosure relates generally to the field of cooling systems for engines and related components and systems.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." Waste heat recovery ("WHR") systems capture a portion of the waste heat to perform useful work, such as generating electrical energy via an expander (e.g., a turbine). Some WHR systems utilize the Rankine cycle ("RC"). The RC is a thermodynamic process in which heat is transferred to a working fluid in an RC circuit. The working fluid is pumped to a boiler where it is vaporized. The vapor is passed through an expander and then through a condenser, where the vapor is condensed back to a fluid. The expander may drive a generator to generate electrical energy. An Organic Rankine cycle ("ORC") is a RC in which the working fluid is an organic, high molecular mass fluid with a liquid-vapor phase change at a lower temperature than that of water. Such a fluid enables heat recovery from relatively lower temperature sources relative to other RC systems.

SUMMARY

One embodiment relates to a system including an integrated cooling system. An example system includes an engine and an exhaust passage fluidly coupled to the engine. The exhaust passage is structured to receive exhaust gas from the engine. A waste heat recovery system includes a boiler operatively coupled to the exhaust passage, and a condenser fluidly coupled to the boiler. An integrated cooling system includes an engine cooling circuit, a waste heat recovery cooling circuit, a waste heat recovery bypass valve, and a controller. The engine cooling circuit includes a first feed pump structured to circulate a coolant fluid between a radiator and the engine. The waste heat recovery cooling circuit is fluidly coupled to the engine cooling circuit. The waste heat recovery cooling circuit includes a second feed pump structured to circulate the coolant fluid between the radiator and the condenser. The waste heat recovery bypass valve is operatively coupled to the exhaust passage upstream of the boiler. The waste heat recovery bypass valve is selectively controllable so as to direct at least a portion of the exhaust gas through an exhaust bypass passage so as to bypass the boiler. The controller is in operative communication with the waste heat recovery bypass valve. The controller is structured to determine a cooling demand of the engine, and to control a valve position of the waste heat recovery bypass valve based on the cooling demand.

Another example embodiment relates to a method for controlling an integrated engine and waste heat recovery cooling system. A coolant fluid is pumped through an engine cooling circuit including a radiator and an engine. The coolant fluid is pumped through a waste heat recovery cooling circuit including the radiator and a condenser of a waste heat recovery system. The waste heat recovery cooling circuit is in fluid communication with the engine cooling circuit. The waste heat recovery system further includes a boiler operatively coupled to an exhaust passage. The exhaust passage is structured to receive exhaust gas from the engine. A cooling demand of the engine is determined. A valve position of a waste heat recovery bypass valve is controlled based on the cooling demand. The waste heat recovery bypass valve is operatively coupled to the exhaust passage upstream of the boiler. Controlling the valve position of the waste heat recovery bypass valve operates to selectively direct at least a portion of the exhaust gas through an exhaust bypass passage so as to bypass the boiler.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Conventionally, engine cooling systems are designed to provide sufficient cooling at worst-case engine operating conditions (e.g., peak engine load and maximum temperature). However, engines typically operate below worst-case conditions, such as at partial load and/or at cool-to-moderate ambient temperatures. Accordingly, engine cooling systems may have spare cooling capacity during normal (e.g., off-peak) operation.

Referring generally to the figures, various embodiments relate to an integrated cooling system for an internal combustion engine and for a WHR system. According to various embodiments, an integrated cooling system utilizes excess cooling capacity that is not needed to cool the engine to cool a condenser of the WHR system. Accordingly, the integrated cooling system eliminates the need for a separate WHR cooling system. Therefore, the integrated cooling system increases the operational efficiency of an engine by enabling waste heat recovery without requiring additional energy usage from a separate WHR cooling system. Further, the integrated cooling system reduces the unit cost, as well as the operating cost, of an engine system including WHR.

According to an embodiment, the integrated cooling system includes a waste heat recovery bypass valve operatively coupled to an engine exhaust passage upstream of a boiler of a WHR system. The waste heat recovery bypass valve is selectively controllable, based on a cooling demand of the engine, so as to direct at least a portion of uncooled exhaust gas through an exhaust bypass passage so as to bypass the boiler. For example, if the engine cooling demand is below a predetermined value (e.g., the engine is not operating at peak load/temperature and the cooling system has spare cooling capacity), the waste heat recovery bypass valve may be controlled so as to direct some or all of the exhaust gas through the boiler of the WHR system, thereby recovering waste heat energy through the WHR system. If the engine cooling demand increases above the predetermined value, the waste heat recovery bypass valve may be controlled so as to direct more or all of the exhaust gas through the exhaust bypass passage so that the integrated cooling system may satisfy the engine cooling demand. In one embodiment, the waste heat recovery bypass valve is controlled so as to control the particular amount of exhaust gas directed through the WHR system, based upon the determined cooling demand. For example, in one embodiment, the waste heat recovery bypass valve is controlled so as to maximize the amount of exhaust gas directed through the WHR system, while satisfying the engine cooling demand.

Figure 1:
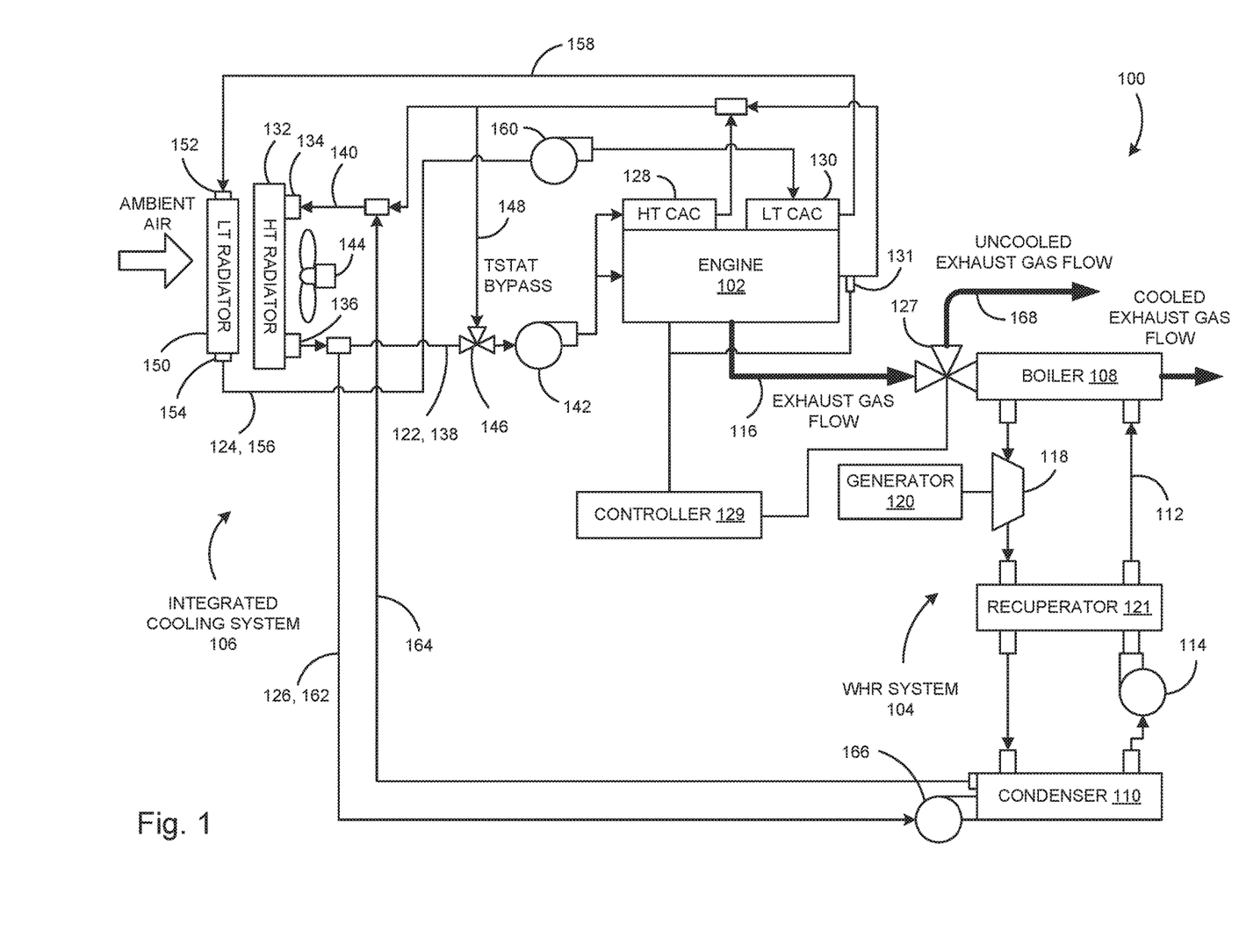
FIG. 1 is a schematic diagram of an system including an engine, a WHR system 104, and an integrated cooling system, according to an embodiment.

FIG. 1 is a schematic diagram of an system 100, including an engine 102, a WHR system 104, and an integrated cooling system 106, according to an embodiment. The integrated cooling system 106 is structured to provide cooling for both the engine 102 and the WHR system 104. The engine 102 may be powered by any of various types of fuels (e.g., diesel, natural gas, gasoline, etc.). In some embodiments, the engine 102 operates as a prime mover for an electric power generator or for a vehicle.

The WHR system 104 is structured to convert waste heat produced by the engine 102 into useful energy, such as electrical energy. The WHR system 104 includes a boiler 108 and a condenser 110 positioned along a working fluid circuit 112. The working fluid circuit 112 includes a first feed pump 114 structured to pump a working fluid through the boiler 108 and the condenser 110. The boiler 108 operates as a heat exchanger to transfer heat energy from waste heat produced by the engine 102 to the working fluid in the working fluid circuit 112, so as to vaporize the working fluid. For example, as illustrated in FIG. 1, the boiler 108 is operatively coupled to an exhaust passage 116 of the engine 102 so as to receive hot exhaust gas from the engine 102. The hot exhaust gas flows through the boiler 108 in a first direction and the working fluid flows through the boiler in an opposite second direction, and heat energy is transferred to the working fluid from the hot exhaust gas, thereby vaporizing the working fluid. In some implementations, however, the boiler 108 may also receive waste heat from other sources, such as from engine cooling systems, charge air cooling systems, etc.

The vaporized working fluid is transferred from the boiler 108 to an expander 118, which is positioned along the working fluid circuit 112 downstream of the boiler 108 and upstream of the condenser 110. As the vaporized working fluid travels through the expander 118, the vapor expands and loses pressure, thereby driving a turbine of the expander 118. The turbine is operatively coupled to a generator 120, which converts the mechanical energy of the rotating turbine into electrical energy. The vaporized working fluid flows from the expander 118 to the condenser 110, where the working fluid is cooled and condensed back to a liquid, and subsequently is recycled through the working fluid circuit 112.

In some embodiments, the WHR system 104 further includes a recuperator 121. The recuperator 121 is positioned along the working fluid circuit downstream of each of the expander 118 and the first feed pump 114 so as to transfer heat from the working fluid exiting the expander 118 to the working fluid exiting the first feed pump 114. This operates to pre-heat the working fluid before it reaches the boiler 108. Some embodiments do not include a recuperator 121.

The integrated cooling system 106 includes a high-temperature cooling circuit 122, a low-temperature cooling circuit 124, a WHR cooling circuit 126, a WHR bypass valve 127, and a controller 129. In general, the high-temperature cooling circuit 122 is structured to provide cooling to the engine 102 and to a high-temperature charge air cooler 128 operatively coupled to the engine 102. The low-temperature cooling circuit 124 is structured to provide cooling to a low-temperature charge air cooler 130 operatively coupled to the engine 102. The WHR cooling circuit 126 is fluidly coupled to the high-temperature cooling circuit 122, and is structured to provide cooling to the condenser 110 of the WHR system 104. The WHR bypass valve 127 is structured to selectively direct exhaust gas around the boiler 108 of the WHR system 104 so as to bypass the WHR system 104. The controller 129 is operatively coupled to various components of the integrated cooling system 106 to control the operation thereof, as discussed further in connection with FIG. 2. In some embodiments, the controller 129 may also be operatively coupled to the engine 102 and the WHR system 104.

According to various embodiments, the integrated cooling system 106 includes various sensors structured to provide measurements indicative of operating conditions of the integrated cooling system 106. For example, as illustrated in FIG. 1, the integrated cooling system 106 includes a temperature sensor 131 structured to provide a temperature measurement of the coolant fluid in the high-temperature cooling circuit 122. More specifically, the temperature sensor 131 may be positioned proximate a coolant outlet of the engine 102 to provide a measurement of the coolant temperature as it exits the engine 102. The integrated cooling system 106 may include any number of temperature sensors structure to provide temperature measurements of any components of the integrated cooling system 106, in various positions in the integrated cooling system 106. The integrated cooling system 106 may also include other types of sensors, such as voltage sensors, current sensors, valve position sensors, etc.

The high-temperature cooling circuit 122 includes a high-temperature radiator 132 having an inlet 134 and an outlet 136. A high-temperature feed line 138 fluidly couples the outlet 136 of the high-temperature radiator 132 to coolant inlets of each of the engine 102 and the high-temperature charge air cooler 128. A high-temperature return line 140 fluidly couples coolant outlets of each of the engine 102 and the high-temperature charge air cooler 128 to the inlet 134 of the high-temperature radiator 132. A second feed pump 142 positioned in the high-temperature feed line 138 is structured to pump a coolant fluid (e.g., water) through the high-temperature cooling circuit 122. Heat is transferred from the engine 102 and the high-temperature charge air cooler 128 to the coolant fluid. After exiting the engine 102 and the high-temperature charge air cooler 128, the coolant fluid flows through the high-temperature radiator 132, which is structured to facilitate heat transfer from the coolant to the external environment. A fan 144 positioned proximate the high-temperature radiator 132 may be utilized to enhance convective heat transfer from the high-temperature radiator 132.

The high-temperature cooling circuit 122 may also include a thermostat bypass 146. The thermostat bypass 146 may include a three-way valve positioned along the high-temperature feed line 138 upstream of the second feed pump 142. A bypass line 148 may fluidly couple the high-temperature return line 140 to the three-way valve of the thermostat bypass 146 so as to selectively facilitate fluid flow through the high-temperature cooling circuit 122 without flowing through the high-temperature radiator 132. In operation, the thermostat bypass 146 may be configured to facilitate coolant flow through the high-temperature cooling circuit 122 without flowing through the high-temperature radiator 132 until a predetermined operating temperature is met, after which the thermostat bypass 146 facilitates coolant flow through the high-temperature radiator 132 so as to remove heat from the coolant. In some embodiments, the thermostat bypass 146 is a passive device, meaning that is structured to be actuated (e.g., to selectively facilitate coolant flow through the bypass line 148) at a single predetermined operating temperature. In other embodiments, the thermostat bypass 146 is dynamically controlled by the controller 129 based on various operational parameters.

The low-temperature cooling circuit 124 includes a low-temperature radiator 150 having an inlet 152 and an outlet 154. A low-temperature feed line 156 fluidly couples the outlet 154 of the low-temperature radiator 150 to the low-temperature charge air cooler 130. A low-temperature return line 158 fluidly couples the low-temperature charge air cooler 130 to the inlet 152 of the low-temperature radiator 150. A third feed pump 160 positioned in the low-temperature feed line 156 is structured to pump a coolant (e.g., a refrigerant or water) through the low-temperature cooling circuit 124. Heat is transferred from the low-temperature charge air cooler 130 to the coolant. After exiting the low-temperature charge air cooler 130, the coolant flows through the low-temperature radiator 150, which is structured to facilitate heat transfer from the coolant to the external environment. The fan 144 positioned proximate the low-temperature radiator 150 may be utilized to enhance convective heat transfer from the low-temperature radiator 150. In one embodiment, the fan 144 rotates so as to pull ambient air in the direction of the arrow shown in FIG. 1. More specifically, the fan 144 rotates such that the coolest ambient air first passes over the low-temperature radiator 150 and then over the high-temperature radiator 132.

In some embodiments, the high-temperature radiator 132 and the low-temperature radiator 150 are discrete components. However, in other embodiments, the high-temperature radiator 132 and the low-temperature radiator 150 are integrated into a single component. For example, some embodiments include a split core radiator, having a high-temperature core and a low-temperature core. In some embodiments, the high-temperature cooling circuit 122 flows through the high-temperature core and the low-temperature cooling circuit 124 flows thorough the low-temperature core. In some embodiments, the high-temperature and low-temperature cooling circuits 122, 124 are not in fluid communication with each other through the radiator. However, in other embodiments, the high-temperature and low-temperature cooling circuits 122, 124 are in fluid communication with each other and converge to a single circuit through the split core radiator.

The WHR cooling circuit 126 is fluidly coupled to the high-temperature cooling circuit 122. More specifically, the WHR cooling circuit 126 includes a WHR feed line 162 fluidly coupling the high-temperature feed line 138 to an inlet of the condenser 110, and a WHR return line 164 fluidly coupling an outlet of the condenser 110 to the high-temperature return line 140. A fourth feed pump 166 positioned in the WHR feed line 162 is structured to pump the coolant fluid of the high-temperature cooling circuit 122 through the WHR cooling circuit 126. Heat is transferred from the condenser 110 of the WHR system 104 to the coolant. After exiting the condenser 110, the coolant is mixed with the coolant in the high-temperature return line 140 and flows through the high-temperature radiator 150, which is structured to facilitate heat transfer from the coolant to the external environment.

The WHR bypass valve 127 is positioned along the exhaust passage 116 upstream of the boiler 108 of the WHR system 104. The WHR bypass valve 127 is fluidly and operatively coupled to the exhaust passage 116, to the boiler 108, and to an exhaust bypass passage 168 parallel to the boiler 108. The WHR bypass valve 127 is structured to selectively direct exhaust gas flow, in whole or in part, through the boiler 108 or through the exhaust bypass passage 168. Operation of the WHR bypass valve 127 controls whether and to what extent the exhaust gas from the engine 102 is cooled by the WHR system 104 or discharged into the external environment without being cooled.

In operation, according to an embodiment, the controller 129 controls operation of the WHR bypass valve 127 to selectively control the amount of cooling provided by the integrated cooling system 106 to the engine 102 relative to the WHR system 104. In one embodiment, the controller 129 may control operation of the WHR bypass valve 127 based on an engine cooling demand. The engine cooling demand may be determined based on the temperature of the engine 102 or of the engine coolant (e.g., the coolant in the high-temperature cooling circuit 122), for example. In some embodiments, the engine cooling demand is further based on any of engine load, vehicle speed, air temperature, or other parameters.

The amount of cooling provided to the WHR system 104 via the WHR cooling circuit 126 is proportional to the amount of heat energy that is transferred into the WHR system 104 from the hot exhaust gas that is directed through the boiler 108. In other words, the hotter the working fluid in the working fluid circuit 112, the more heat that is transferred to the coolant fluid in the WHR cooling circuit 126. Therefore, all other things being equal, the hotter the working fluid in the working fluid circuit 112, the greater the amount of cooling capacity of the integrated cooling system 106 that is provided to cool the WHR system 104.

In general, according to various embodiments, the controller 129 is structured to control operation of the WHR bypass valve 127 so as to control the operational output of the WHR system 104, while providing sufficient cooling to the engine 102. For example, in one embodiment, the controller 129 is structured to control operation of the WHR bypass valve 127 so as to maximize the operational output of the WHR system 104, while providing sufficient cooling to the engine 102. In one embodiment, the default position of the WHR bypass valve 127 is closed, such that all of the exhaust gas is directed through the boiler 108 of the WHR system 104. The controller 129 is structured to open the WHR bypass valve 127 to only the extent necessary to decrease the amount of cooling capacity utilized by the WHR system 104, such that sufficient cooling capacity is available to cool the engine 102 to keep the engine from exceeding its maximum rated operating temperature.

In some embodiments, the controller 129 is structured to control other components or devices in connection with controlling the integrated cooling system 106. For example, in one embodiment, the controller 129 is operatively coupled to the thermostat bypass 146. The controller 129 may be structured to control the valve of the thermostat bypass 146 so as to dynamically control fluid flow through the bypass line 148. In other embodiments, the controller 129 is operatively coupled to any of the first, second, third, and fourth feed pumps 114, 142, 160, 166. The controller 129 may be structured to independently control the fluid flow through each of the first, second, third, and fourth feed pumps 114, 142, 160, 166 based on various factors, such as the fluid temperature within any of the feed or return lines, engine cooling demand, etc. For example, in one embodiment, the controller 129 may control operation of each of the second and fourth feed pumps 142, 166 so as to control the flow rate of the coolant fluid through the high-temperature cooling circuit 122 relative to the flow rate of the coolant fluid through the WHR cooling circuit 126. In another embodiment, one or more of the thermostat bypass 146, and the first, second, third, and fourth feed pumps 114, 142, 160, 166 are dynamically controlled so as to maintain a coolant fluid temperature at the coolant outlet of the engine 102 (e.g., via the temperature sensor 131) at a predetermined temperature.

Figure 2:
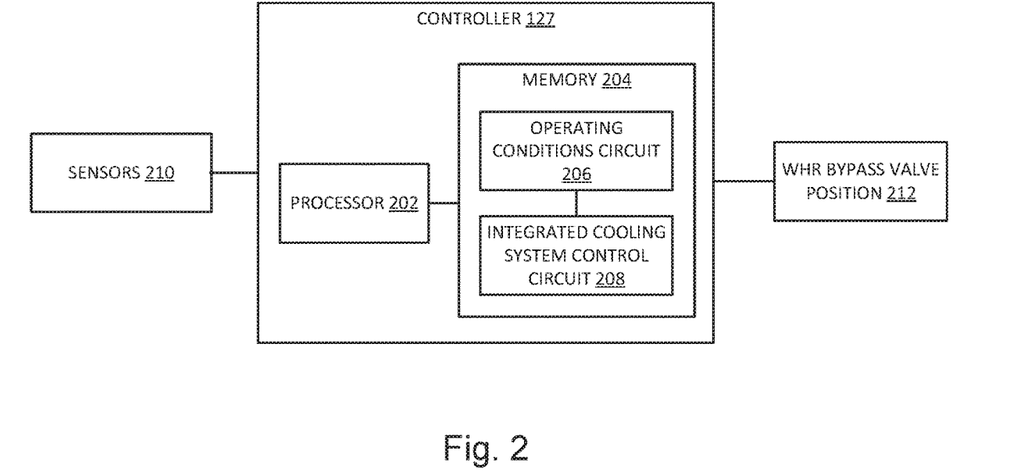
FIG. 2 is a block diagram of the controller of FIG. 1, according to an embodiment.

FIG. 2 is a block diagram of the controller 129 of FIG. 1, according to an embodiment. The controller 129 includes a processor 202 and memory 204. The memory 204 is shown to include an operating conditions circuit 206 and an integrated cooling system control circuit 208 communicably coupled to the operating conditions circuit 206. In general, the operating conditions circuit 206 and the integrated cooling system control circuit 208 are structured to control operation of the integrated cooling system 106 based on monitored operating conditions of the system 100. While various circuits with particular functionality are shown in FIG. 2, it should be understood that the controller 129 may include any number of circuits for completing the functions described herein. For example, the activities of multiple circuits may be combined as a single circuit, additional circuits with additional functionality may be included, etc. Further, it should be understood that the controller 129 may further control other vehicle activity beyond the scope of the present disclosure.

Certain operations of the controller 129 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The operating conditions circuit 206 is in operative communication with various sensors 210. For example, the sensors 210 may include the temperature sensor 131 of FIG. 1. The operating conditions circuit 206 is structured to receive measurement values from the sensors 210, and to interpret measurement values based on the received measurement values. The sensors 210 may include any of various types of sensors configured to measure characteristics related to the engine 102, the WHR system 104, the integrated cooling system 106, and/or related systems. The sensors may also include other temperature sensors (e.g., on the engine block, in any of the coolant passages, in the exhaust passage, or in any other location), an engine speed sensor, an engine torque sensor, a vehicle speed sensor, a position sensor, etc. Accordingly, the measurement values may include, but are not limited to, an engine temperature, a coolant temperature, an exhaust temperature, an engine speed, an engine load, a vehicle speed, a valve position, and/or any other engine or system characteristics.

The integrated cooling system control circuit 208 is in operative communication with the operating conditions circuit 206, as well as the WHR bypass valve 127. The integrated cooling system control circuit 208 is structured to control operation of the WHR bypass valve 127 based on the monitored operating conditions of the system 100, as discussed further in connection with FIG. 3.

Figure 3:
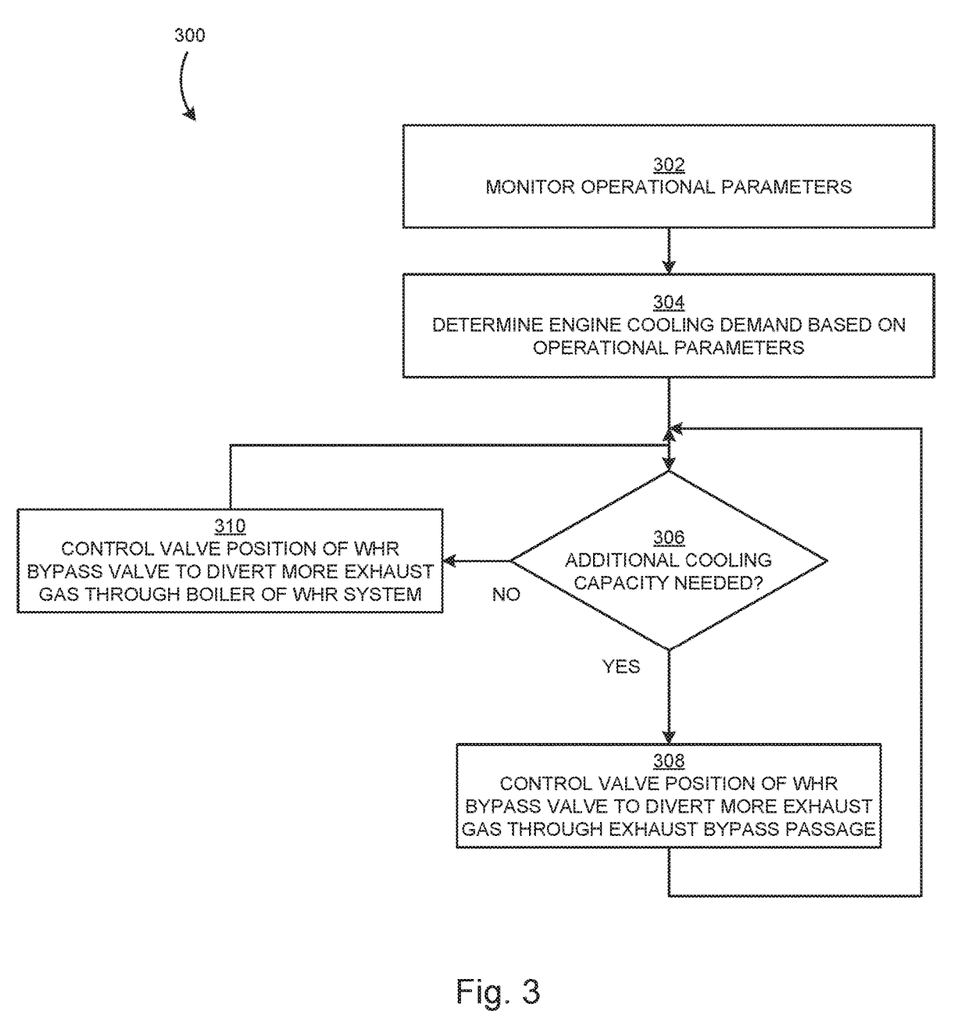
FIG. 3 is a flow diagram of a method of controlling an integrated cooling system for an engine and a WHR system, according to an embodiment.

FIG. 3 is a flow diagram of a method 300 of controlling an integrated cooling system for an engine and a WHR system, according to an embodiment. For example, the method 300 may be performed by the controller 129 of FIGS. 1 and 2 to control the integrated cooling system 106 of FIG. 1.

At 302, operational parameters of at least one of the engine 102 and the integrated cooling system 106 are monitored. For example, the operation parameters may include engine temperature, coolant temperature, engine load, engine speed, vehicle speed, etc., or any combination thereof.

At 304, the cooling demand of the engine 102 is determined based on the operational parameters. For example, in one embodiment, the cooling demand is determined based on a temperature of the coolant exiting the engine 102. In another embodiment, the cooling demand is determined based on a temperature of the engine block. The cooling demand may also be based on engine load, engine speed, vehicle speed, etc. For example, the cooling demand may be higher, or may be expected to increase, if the engine load or engine speed increases. Alternatively, the cooling demand may be lower or may be expected to decrease if the vehicle speed increases. In some embodiments, the cooling demand relates to the rate of change of coolant temperature.

At 306, the controller 129 analyzes whether additional cooling capacity is needed, based on the cooling demand. For example, additional cooling capacity may be needed if the cooling demand increases over time. In other words, additional cooling capacity may be needed if the current amount of cooling provided by the integrated cooling system 106 is anticipated to be insufficient to prevent the engine 102 from exceeding a maximum operating temperature.

At 308, if additional cooling capacity is needed (i.e., the answer to 306 is "YES"), the valve position of the WHR bypass valve 127 is controlled so as to divert more exhaust gas through the exhaust bypass passage 168. In other words, the WHR bypass valve 127 is controlled so as to divert less exhaust gas through the boiler 108 of the WHR system 104. Accordingly, less heat is transferred to the WHR system 104 from the exhaust gas, so less cooling capacity of the integrated cooling system 106 is needed to cool the condenser 110 of the WHR system 104. Therefore, more cooling capacity of the integrated cooling system 106 is available to cool the engine 102. Process 308 may result in the WHR bypass valve 127 being partially open to fully open, such that some or all of the exhaust gas is diverted through the exhaust bypass passage 168.

At 310, if additional cooling capacity is not needed (i.e., the answer to 306 is "NO"), the valve position of the WHR bypass valve 127 is controlled so as to divert more exhaust gas through the boiler 108 of the WHR system 104. In other words, the WHR bypass valve 127 is controlled so as to divert less exhaust gas through the exhaust bypass passage 168. Accordingly, more heat is transferred to the WHR system 104 from the exhaust gas, so more cooling capacity of the integrated cooling system 106 is needed to cool the condenser 110 of the WHR system 104. Therefore, less cooling capacity of the integrated cooling system 106 is available to cool the engine 102. Process 310 may result in the WHR bypass valve 127 being partially closed to fully open, such that some or all of the exhaust gas is diverted through the boiler 108 of the WHR system 104.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

In certain implementations, the systems or processes described herein can include a controller structured to perform certain operations described herein. In certain implementations, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain implementations, the controller includes one or more circuits structured to functionally execute the operations of the controller. The description herein including circuits emphasizes the structural independence of the aspects of the controller, and illustrates one grouping of operations and responsibilities of the controller. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 1-3.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuits specification, any actuator including at least an electrical, hydraulic, or pneumatic actuator, a solenoid, an op-amp, analog control elements (springs, filters, integrators, adders, dividers, gain elements), and/or digital control elements.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be understood by those of skill in the art who review this disclosure that various features are described and claimed without restricting the scope of these features to the precise numerical ranges provided unless otherwise noted. Accordingly, insubstantial or inconsequential modifications or alterations of the subject matter described and claimed are considered to be within the scope of the invention as recited in the appended claims.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A system comprising:
an engine;
an exhaust passage fluidly coupled to the engine, the exhaust passage structured to receive exhaust gas from the engine;
a waste heat recovery system, including a boiler operatively coupled to the exhaust passage, and a condenser fluidly coupled to the boiler; and
an integrated cooling system, including:
an engine cooling circuit, including a first feed pump structured to circulate a coolant fluid between a radiator and the engine,
a waste heat recovery cooling circuit fluidly coupled to the engine cooling circuit, the waste heat recovery cooling circuit including a second feed pump structured to circulate the coolant fluid between the radiator and the condenser,
a waste heat recovery bypass valve operatively coupled to the exhaust passage upstream of the boiler, the waste heat recovery bypass valve being selectively controllable so as to direct at least a portion of the exhaust gas through an exhaust bypass passage so as to bypass the boiler, and
a controller in operative communication with the waste heat recovery bypass valve, the controller structured to:
determine a cooling demand of the engine, and
control a valve position of the waste heat recovery bypass valve based on the cooling demand;
wherein the engine cooling circuit is a high-temperature cooling circuit, the coolant fluid is a first coolant fluid, and the radiator is a high-temperature radiator, and
wherein the integrated cooling system further includes a low-temperature cooling circuit including a third feed pump structured to circulate a second coolant fluid between a low-temperature radiator and a low-temperature charge air cooler, the low-temperature charge air cooler structured to cool intake air entering an intake manifold of the engine.

2. The system of claim 1, wherein the high-temperature cooling circuit further includes:
a high-temperature feed line fluidly coupling an outlet of the high-temperature radiator to a coolant inlet of the engine, the first feed pump positioned along the high-temperature feed line;
a high-temperature return line fluidly coupling a coolant outlet of the engine to an inlet of the high-temperature radiator;
a thermostat positioned along the high-temperature feed line upstream of the first feed pump; and
a thermostat bypass line fluidly coupling the thermostat and the high-temperature return line,
wherein the thermostat is structured to block flow of the first coolant fluid from the high-temperature radiator until the first coolant fluid reaches a predetermined operating temperature.

3. The system of claim 2, wherein the controller is in further operative communication with the thermostat, the controller further structured to:
retrieve a thermostat temperature value from the thermostat;
interpret the thermostat temperature value; and
controllably adjust a valve of the thermostat based on each of the thermostat temperature value.

4. The system of claim 1, wherein the first feed pump of the high-temperature cooling circuit is further structured to circulate the first coolant fluid between the high-temperature radiator and a high-temperature charge air cooler, the high-temperature charge air cooler structured to cool intake air entering the intake manifold of the engine.

5. The system of claim 1, wherein the first coolant fluid is water-based, and wherein the second coolant fluid is refrigerant-based.

6. A method for controlling an integrated engine and waste heat recovery cooling system, the method comprising:
pumping a coolant fluid through an engine cooling circuit including a radiator and an engine;
pumping the coolant fluid through a waste heat recovery cooing circuit including the radiator and a condenser of a waste heat recovery system, the waste heat recovery cooling circuit in fluid communication with the engine cooling circuit, the waste heat recovery system further including a boiler operatively coupled to an exhaust passage, the exhaust passage structured to receive exhaust gas from the engine;
determining a cooling demand of the engine; and
controlling a valve position of a waste heat recovery bypass valve based on the cooling demand, the waste heat recovery bypass valve operatively coupled to the exhaust passage upstream of the boiler,
wherein the controlling the valve position of the waste heat recovery bypass valve operates to selectively direct at least a portion of the exhaust gas through an exhaust bypass passage so as to bypass the boiler,
wherein the engine cooling circuit is a high-temperature cooling circuit, the coolant fluid is a first coolant fluid, and the radiator is a high-temperature radiator, and
further comprising pumping a second coolant fluid through a low-temperature cooling circuit including a low-temperature radiator and a low-temperature charge air cooler, the low-temperature charge air cooler structured to cool intake air entering an intake manifold of the engine.

7. The method of claim 6, wherein the high-temperature cooling circuit further includes:
a high-temperature feed line fluidly coupling an outlet of the high-temperature radiator to a coolant inlet of the engine;
a first feed pump positioned along the high-temperature feed line;
a high-temperature return line fluidly coupling a coolant outlet of the engine to an inlet of the high-temperature radiator;
a thermostat positioned along the high-temperature feed line upstream of the first feed pump; and
a thermostat bypass line fluidly coupling the thermostat and the high-temperature return line; and
further comprising controlling the thermostat so as to block flow of the first coolant fluid from the high-temperature radiator until the first coolant fluid reaches a predetermined operating temperature.

8. The method of claim 7, further comprising:
retrieving a thermostat temperature value from the thermostat;
interpreting the thermostat temperature value; and
controllably adjusting a valve of the thermostat based on the thermostat temperature value.

9. The method of claim 6, wherein the high-temperature cooling circuit further includes a high-temperature charge air cooler structured to cool intake air entering the intake manifold of the engine; and further comprising pumping the first coolant fluid between the high-temperature radiator and the high-temperature charge air cooler.

10. The method of claim 6, wherein the first coolant fluid is water-based, and wherein the second coolant fluid is refrigerant-based.

\* \* \* \* \*